S. SHORT.
HORSESHOE.
No. 15,306.  Patented July 8, 1856.
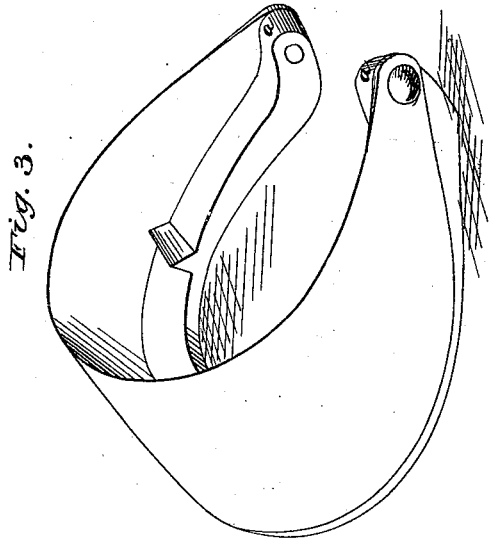
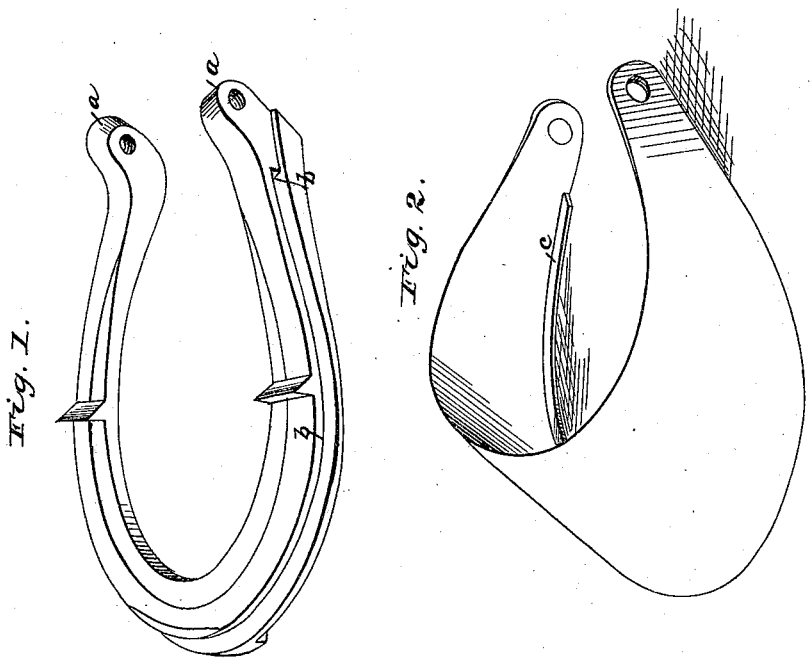

UNITED STATES PATENT OFFICE.

SEWALL SHORT, OF NEW LONDON, CONNECTICUT.

IMPROVED HORSESHOE.

Specification forming part of Letters Patent No. 15,306, dated July 8, 1856.

*To all whom it may concern:*

Be it known that I, SEWALL SHORT, of New London, in the State of Connecticut, have invented certain new and useful improvements in constructing and applying horseshoes or other metal shoes to horses and other animals to which they are applicable; and I herein describe and ascertain said improvement and its modifications.

My improvement consists in the mode of attaching the shoe to the hoof without nails, and in a manner to be easily taken off, shifted, and replaced by a common groom or other person, as may be found desirable. For this purpose I have devised several modes of construction, which I have heretofore caveated. One of these consists in casting the shoe or tread part of the shape of an ordinary horseshoe, but in two parts, having a rim extending up over the hoof. The two parts were jointed together and had a bolt or screw to hold them at the heel, running across from side to side. Another mode was to cast the tread part whole, with half or more of the rim permanently affixed to it, and the rest jointed on, so as to open, receive the foot, and close upon it. This was also bolted at the heel. These, although original devices of mine, I consider inferior to the following construction.

I form a horseshoe of ordinary configuration, with the addition of an upward projection, *a a*, on each end at the heel, as clearly shown in Fig. 1, and a groove all around the edge of the shoe outside, as seen at *b b*, same figure. I also make a rim of the configuration of the top of the hoof, to which it is to be applied, as seen at Fig. 2. This rim has a tongue or rib on its inside lower edge, that fits into the groove *b b* of Fig. 1. The rib is lettered *c*. There is a hole through each end of the rim or cap, by which they are affixed to the projections *a a* on the shoe by means of a screw or other fastening, the rib *c* holding the two parts firmly together, and the whole is as securely fixed upon a horse as if it were nailed, while by simply unscrewing the rim from the shoe it can be taken off when worn out, and replaced by another new shoe; or it can be shifted from a sharpened shoe for ice, &c., to a smooth shoe, and vice versa, without trouble or injury to the hoof. The top or cap, Fig. 2, will wear out many treads or shoes, and thus a good cap can be well fitted to the hoof it is intended for, made very light, and be perfectly effective. It may be made ornamental, and is easily and cheaply constructed, while the shoe part is as readily made as an ordinary horseshoe.

I propose, as a further improvement, to have the cap and sole made as above described, and then have a sole or tread riveted onto the shoe before it is put onto the hoof. This tread or sole can be renewed at will. This kind of shoe is peculiarly applicable to hard service, such as omnibus-horses, &c. Shoes which are thus easily removed afford facilities heretofore unknown for keeping the hoof in perfect order. It can frequently be nicely pared and shaped, to fit at all times the shoe, and it can be removed in the box or stall when the animal is not used, if the feet be tender.

Having thus fully described my invention, what I claim therein as new, and for which I desire Letters Patent, is—

1. The combination of the cap and shoe, made in two separate pieces, the cap and shoe being constructed separately, substantially in the manner and for the purposes herein set forth, of easy application and ready removal.

2. The rib and groove attaching the cap and shoe, as above specified.

SEWALL SHORT.

Witnesses:
 J. C. GREENOUGH,
 SAML. COLMAN.